United States Patent
Knott

(10) Patent No.: US 12,106,527 B2
(45) Date of Patent: Oct. 1, 2024

(54) REALTIME CONVERSION OF MACROBLOCKS TO SIGNED DISTANCE FIELDS TO IMPROVE TEXT CLARITY IN VIDEO STREAMING

(71) Applicant: ATI Technologies ULC, Markham (CA)

(72) Inventor: Isabelle Elizabeth Knott, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/931,499

(22) Filed: Sep. 12, 2022

(65) Prior Publication Data
US 2024/0087169 A1    Mar. 14, 2024

(51) Int. Cl.
G06T 9/00    (2006.01)
H04N 19/70    (2014.01)

(52) U.S. Cl.
CPC .............. *G06T 9/00* (2013.01); *H04N 19/70* (2014.11)

(58) Field of Classification Search
CPC .................................. G06T 9/00; H04N 19/70
See application file for complete search history.

(56) References Cited

U.S. PATENT DOCUMENTS

| | | | |
|---|---|---|---|
| 8,648,858 B1 * | 2/2014 | Swenson | H04N 19/176 345/428 |
| 9,020,272 B1 | 4/2015 | Esfahbod Mirhosseinzadeh Sarabi et al. | |
| 9,247,260 B1 * | 1/2016 | Swenson | H04N 19/423 |
| 11,024,014 B2 | 6/2021 | Sylvan et al. | |
| 11,074,724 B2 | 7/2021 | Gueniot et al. | |
| 2021/0375324 A1 * | 12/2021 | Morton | H04N 9/8205 |

FOREIGN PATENT DOCUMENTS

| | | |
|---|---|---|
| CN | 106851294 A | 6/2017 |
| EP | 3961499 A1 | 3/2022 |
| WO | 2022098367 A1 | 5/2022 |

OTHER PUBLICATIONS

International Search Report and Written Opinion for PCT/IB2023/058866, date mailed Nov. 23, 2023, 9 pages.

(Continued)

*Primary Examiner* — Jae N Noh
(74) *Attorney, Agent, or Firm* — Kowert, Hood, Munyon, Rankin & Goetzel, P.C.; Rory D. Rankin

(57) ABSTRACT

An apparatus and method for performing efficient video transmission. In various implementations, a computing system includes a transmitter sending a video stream to a receiver over a network. Before encoding a video frame, the transmitter identifies a first set of one or more macroblocks of the video frame that includes text. The transmitter replaces pixel color information with pixel distance information for the first set of one or more macroblocks. The transmitter inserts, in metadata information, indications that identify the first set of one or more macroblocks and specify the color values of pixels in the first set of one or more macroblocks. The transmitter encodes the video frame and sends it along with the metadata information to the receiver. The receiver uses the metadata information to reproduce the original pixel colors and maintain text clarity of an image to be depicted on a display device.

20 Claims, 5 Drawing Sheets

(56) References Cited

OTHER PUBLICATIONS

Green, Chris, "Improved Alpha-Tested Magnification for Vector Textures and Special Effects". ACM SIGGRAPH 2007 Papers—International Conference on Computer Graphics and Interactive Techniques, 2007,pp. 9-18, [online] [retrieved on Nov. 17, 2023 (Nov. 17, 2023)]. Retrieved from the Internet: htt11s://doi.org/I0.I145/1281500.1281665.

* cited by examiner

REALTIME CONVERSION OF MACROBLOCKS TO SIGNED DISTANCE FIELDS TO IMPROVE TEXT CLARITY IN VIDEO STREAMING

BACKGROUND

Description of the Relevant Art

Video processing algorithms are complex and include many different functions. Computing systems use advanced processors to satisfy the high computation demands. The video processing complexity increases as display resolution increases. Additionally, high-definition video encoding applications are growing rapidly in the consumer market space. Further, video processing becomes more complex as the available data bandwidth decreases and the processing occurs in real-time. For example, desktop streaming services have become commonplace and include services that allows a user to access in real-time through a network, such as the Internet, a variety of content provided on remote servers. The content is presented in a virtual computing environment on the user's computing device such as a laptop computer, desktop computer, or other. Remote desktop services (RDS) provide a replicated view of a work desktop environment typically provided on a user's work desktop computer, but is now presented on a user's remote computing device. Remote applications are hosted or run on a virtual machine (VM), but appear as if the applications are running on the user's remote computing device as local applications.

Video game (or gaming) streaming services is another example of services providing real-time presentation of content on a user's remote computing device where the content is updated in real-time based on user input. Live streaming services that broadcast live content of a user making a presentation is yet another example of such real-time services. To avoid skipping or glitches of video content on a monitor or screen of the user's remote computing device, a video encoder increases video compression ratios prior to sending video frames through the network to the user's remote computing device.

It is common for particular regions of a video frame corresponding to an image to view on a screen of the user's remote computing device to include blocks of text. For example, the video frames corresponding to applications of remote desktop services frequently include text. The visual clarity of these particular regions, such as particular macroblocks, of the video frame reduces as video compression ratios increase. As the compression provided by the video encoder increases, text in these particular macroblocks can also appear blurry due to a lack of sharp contrast at the edges of the text. If the technique of sub-pixel anti-aliasing is used, then the resulting compressed pixel values can cause additional colors to appear at the edges of the text, which further reduces visual clarity.

In view of the above, methods and systems for performing efficient video transmission that preserves text clarity are desired.

Figure 1:
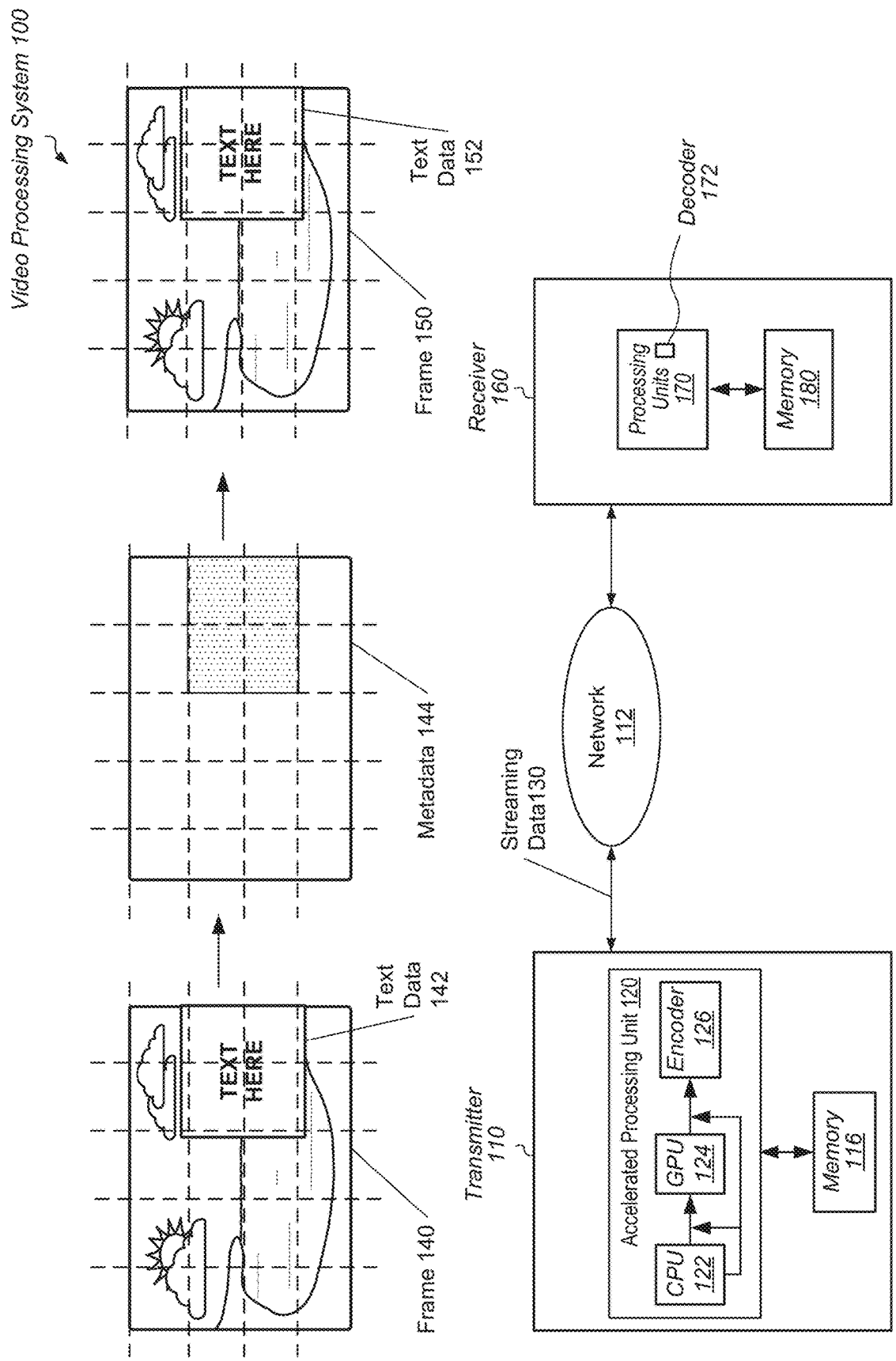
FIG. 1 is a generalized block diagram of a video processing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Various systems, apparatuses, and methods for performing efficient video transmission are disclosed. In various implementations, a computing system includes a transmitter sending a video stream to a receiver over a network such as the Internet. In an implementation, the transmitter is a remote server and the receiver is a user's computing device that communicates with the remote server over the network. The transmitter supports the receiver executing a streaming service such as a desktop streaming service, a live streaming service, a video game streaming service, or other. The streaming service provides real-time updates of video content based on inputs from the user as the user executes the streaming service on the receiver. In some implementations, the remote server includes circuitry of an accelerated processing unit (APU) that includes multiple different integrated circuits, each providing different functionality. For example, the APU includes at least a general-purpose processing unit, such as a central processing unit (CPU), with multiple cores capable of executing instructions of a general-purpose instruction set architecture (ISA). The APU also includes a parallel data processing unit, such as a graphics processing unit (GPU), that includes the circuitry of one or more processor cores with a single instruction multiple data (SIMD) parallel architecture. The APU further includes a video encoder for compressing video frames of an image to be depicted on a display device of the user's computing device.

The hardware, such as circuitry, of the transmitter receives rendered source data of the image. For example, based on commands generated by the CPU, the GPU renders the video frame corresponding to the image. The video encoder encodes (i.e., compresses) the rendered video frame by dividing the video frame into macroblocks, and generating a compressed bitstream. As used herein, a "bitstream" is a sequence of bits. The video encoder stores the generated (and compressed) bitstream in a buffer prior to the transmitter sending the compressed bitstream over the network to the receiver. However, before the video encoder compresses the macroblocks, one or more of the CPU, the GPU or another integrated circuit of the transmitter identifies which one or more macroblocks of the video frame entirely consist of rendered text. These one or more macroblocks provide a first set of one or more macroblocks of the video frame. If no such macroblocks exist in the video frame, the transmitter processes the video without using the below additional steps, and moves on to the next video frame. The circuitry of the transmitter uses one of a variety of techniques for detecting the first set of one or more macroblocks. Examples of these techniques are one of a variety of edge-based algorithms that rely on computed edge densities or computed edge gradients of macroblocks, summing counts of these values in one or more histograms, and analyzing the one or more histograms for text detection.

The transmitter replaces a first data representation of the first set of one or more macroblocks with a second data representation different from the first data representation. In an implementation, the first data representation includes pixel information such as one or more color values corresponding to one or more color components. Typically, for a black and white image, a single color value corresponding to a single gray-level color component is used where the color values are positive integers with a range from 0 that indicates the color black to 255 that indicates the color white. Therefore, a single byte (8 bits) can be used to represent the pixel. For color images, three or more color values corresponding to three or more color components. In an example, three color values are used to represent the red, green, and blue components. With each color component using a byte, three bytes are used to represent the pixel. However, after replacing the macroblocks that were identified in the previous step as the first set of one or more macroblocks, the pixels in the first set of macroblocks no longer represent pixel color data. Rather, the pixels in the first set of macroblocks represent the closest pixel distance to the surface of the identified rendered text.

In one implementation, a distance value in the second data representation for a pixel in the macroblock is a signed distance field (SDF) value for the pixel. The SDF value represents a shortest distance between the corresponding pixel and the nearest glyph in the macroblock to the pixel. As used herein, a "glyph" is a graphical symbol used to represent an alphabet letter. For example, the alphabet letter "A" has a particular graphical symbol (or glyph) that changes based on a selected font, a selected text size, and selected characteristics such as an italicized print, bold print, and so on. In another implementation, the value in the second data representation for a pixel in the macroblock encodes the coordinates of the closest point on the surface of the glyph, as well as a 1-dimensional representation of the normal vector of that surface. It is possible and contemplated that a variety of other distance information corresponding to the pixel and the nearest glyph in the macroblock can be used in the second data representation.

The circuitry of the transmitter inserts, in metadata information corresponding to the video frame, one or more indications that identify the first set of one or more macroblocks. The transmitter also inserts, in the metadata information, indications that specify the color values of pixels in the first set of one or more macroblocks. Generally speaking, rendered text includes only a foreground color (the color of the glyphs) and a background color. In such a case, only two color values are transmitted per macroblock. In another implementation, additional color values are transmitted to account for multi-colored text along with information that describes which regions of the macroblock use which of the color values. A video encoder compresses (encodes) the macroblocks of the video frame. Therefore, the transmitter encodes one or more macroblocks that include pixel color information, and additionally encodes one or more macroblocks that had pixel color information replaced with pixel distance information. However, the video encoder does not receive metadata information or any information identifying the first set of one or more macroblocks. Accordingly, the video encoder is unaware of which macroblocks include pixel color information and which macroblocks include pixel distance information.

Afterward, the transmitter sends the metadata information and encoded macroblocks of the video frame to the receiver with a display device. The receiver includes a decoder for decoding (decompressing) the encoded macroblocks of the video frame. After decoding the macroblocks of the video frame, the receiver converts the pixel distance information to pixel color information. To do so, the receiver uses the metadata information to identify macroblocks that had pixel color information replaced with pixel distance information. As described earlier, the metadata information also includes at least the foreground and background color values. Further details of the efficient video transmission that preserves text clarity are provided in the following description of FIGS. 1-5.

Referring to FIG. 1, a generalized block diagram is shown of a video processing system 100. The video processing system 100 (or system 100) includes at least a transmitter 110 and a receiver 160 capable of communicating with one another with a limited bandwidth connection through the network 112. Transmitter 110 and receiver 160 are representative of any type of communication devices and/or computing devices. For example, in various implementations, transmitter 110 and/or receiver 160 is one of a mobile phone (or smartphone), a tablet, a desktop computer, a laptop computer, a server computer (or server), a gaming console connected to a television, or other types of computing or communication devices. In various implementations, the transmitter 110 and the receiver 160 include a network interface (not shown) supporting one or more communication protocols for data and message transfers through the network 112. The transmitter 110 sends video information to the receiver 160 such as rendered information corresponding to the video frame 140 (or frame 140). Although the frame 140 depicts a picture of a lake with overlaying text data 142, in other examples, the frame 140 includes information for a wide variety of visual information such as a scene of a sporting event, a scene of a video game, a virtual desktop corresponding to a remote desktop connection, a live stream from a particular user, and so forth.

In some implementations, the transmitter 110 supports the receiver 160 executing a streaming service such as a desktop streaming service, a live streaming service, a video game streaming service, or other. The streaming service provides real-time updates of video content, such as the frame 140, based on inputs from the user as the user executes the streaming service on the receiver 160. The network 140 includes multiple switches, routers, cables, wireless transmitters, and the Internet for transferring messages and data. Accordingly, in some implementations, the network interfaces of the transmitter 110 and the receiver 160 support the Hypertext Transfer Protocol (HTTP) for communication across the World Wide Web. In other implementations, the network interfaces of the transmitter 110 and the receiver 160 support the Transmission Control Protocol (TCP), the User Datagram Protocol (UDP), or other. It is also noted that in some implementations, one or more wireless links are used to transfer data between the transmitter 110 and the receiver 160. For each of the transmitter 110 and the receiver 160, clock sources, such as phase lock loops (PLLs), an interrupt controller, a communication fabric, data buses, power controllers, memory controllers, interfaces for input/output (I/O) devices, and so forth are not shown in the system 100 for ease of illustration.

The circuitry of the transmitter 110 provides any number and type of processors and memory devices. In an implementation, the circuitry of the transmitter 110 includes an accelerated processing unit (APU) 120 on a motherboard that includes a general-purpose central processing unit (CPU) 122, a graphics processing unit (GPU) 124, and a video encoder 126 (or encoder 126). In another implementation, the CPU 122 is in a package on the motherboard, and one or more slots (sockets) on the motherboard include a video graphics card with the GPU 124 and one or more additional GPUs. In yet other implementations, the transmitter 110 includes one or more of an application specific integrated circuit (ASIC), a field programmable array (FGPA), other types of parallel data processor, and so forth. Memory 116 uses one or more of a variety of random-access memories (RAMs), hard disk drives (HDDs), solid state drives (SSDs), and so forth. In a similar manner, the circuitry of the receiver 160 provides any number and type of processors and memory devices as described above to implement the processor 170 and the memory 180.

The CPU 122 uses one or more processor cores with circuitry for executing instructions according to one of a variety of predefined general-purpose instruction sets. The GPU 124 uses multiple parallel execution lanes in a single instruction multiple data word (SIMD) micro-architecture. In one example, one or more of an operating system scheduler executed by the CPU 122 and a command processor in the GPU schedules commands on the SIMD lanes. In some implementations, the GPU 124 includes a pixel-processing pipeline. In other implementations, the pixel-processing pipeline is located externally from the GPU 124. One or more of the SIMD lanes and the pixel-processing pipeline performs pixel value calculations, vertex transformations, and other graphics operations such as color management, ambient-adaptive pixel (AAP) modification, dynamic backlight control (DPB), panel gamma correction, and dither.

The video encoder 126 encodes (i.e., compresses) a video stream prior to transmitting the video stream to receiver 160. As used herein, a "compression level" is also referred to as an "amount of compression" or a "compression ratio." The larger the compression level or the compression ratio, the greater the amount of compression and the smaller the amount of included video information. Similarly, the smaller the compression level or the compression ratio, the smaller the amount of compression and the greater the amount of included video information. In various implementations, the video encoder 126 (or encoder 126) is implemented using any suitable combination of hardware and/or software such as firmware.

The encoder 126 generates bits in a bitstream and stores them in a buffer. As used herein, a "bitstream" is a sequence of bits. In some cases, the output bitstream of the encoder is measured as a "bitrate," which is a number of bits that are generated or processed per unit of time. For example, in some designs, the bitrate is expressed in units of kilobits per second (kbps) or megabits per second (mbps). As used herein, each of the terms "macroblock" and "block" is used to refer to a group of pixels. For example, in one implementation, a block is a group of 16×16 contiguous pixels that forms a square in the image being displayed. In other implementations, other shapes and/or other sizes of blocks (or macroblocks) are used.

The encoder 126 receives uncompressed, rendered video information, and generates the bits in the form of a bitstream in a compressed format that conforms to a standard video compression specification. Examples of the compression specification or standard are a variety of proprietary custom-designed codecs, MPEG-2 Part 2, MPEG-4 Part 2, H.264 (MPEG-4 Part 10), H.265 (High Efficiency Video Coding for supporting the compression of 4K video), Theora, Real-Video RV40, VP9, and AV1. The compression provided by the encoder 126 is typically lossy, so the output compressed video information lacks some of the information present in the original, rendered, and uncompressed video information. The video information is typically divided into frames, and the frames are sometimes divided into macroblocks, or blocks.

Due to the lossy characteristic of compression, the encoder 126 determines which information of the original, rendered, and uncompressed video information to remove while minimizing visual quality degradation of the image depicted on a display device (not shown) of the receiver 160 as viewed by a user. For example, the encoder 126 determines which regions of the block or the frame video information to compress with higher compression ratios and which regions to compress with lower compression ratios. In addition, the compression algorithms track the amount of data used to represent the video, which is determined by the bitrate, while also tracking the storage levels of buffers storing the compressed video information to avoid underflow and overflow conditions.

Due to the above reasons, the encoder 126 faces many challenges to support compression of the received, rendered video information while achieving a target compression ratio, minimizing latency of video transmission, preventing overflow and underflow conditions of buffers storing output data, and maximizing user subjective image quality on a display device. Additionally, the encoder 126 often removes higher-frequency information from the video frame corresponding to an image in order to maintain the target bitrate. The sharp contrast edges of text are an example of this type of high frequency information. The visual clarify of these edges reduce due to video compression. However, replacing the pixel color information of macroblocks that include text with pixel distance information, such as SDF values, reduces the high frequency information. These macroblocks no longer include sharp differences in numerical values, but rather, these macroblocks include smoothly changing values. In an example, the transmitter 110 replaces pixel color values, such as (142, 48, 96), with pixel distance values such as (178, 178, 178). The steps used to perform this replacement are further described below regarding the CPU 122 and the APU 120.

In various implementations, the transmitter 110 sends the frame 140 as multiple macroblocks, which are depicted by the dashed lines placed over the frame 140. In the illustration, the frame 140 includes 20 macroblocks. However, it is possible and contemplated that the frame 140 includes any number of macroblocks based on design requirements. As described earlier, the frame 140 includes a single image with one or more objects such as the objects of the lake, the clouds and the sun in the sky, and the text box 142 that includes one or more glyphs such as the alphabet letters used to spell the words "TEXT" and "HERE."

The CPU 122 translates instructions of a parallel data function call of an application to commands that are executable by the GPU 124. The GPU 124 stores the rendered video information of the frame 140 in one or more of a local buffer and the memory 116. Before the video encoder 126 compresses the rendered macroblocks, one or more of the CPU 122, the GPU 124, or another integrated circuit of the transmitter 110 identifies a first set of one or more macroblocks of the frame 140 corresponding to the image that includes text such as the text box 142. In the illustrated implementation, 4 of the 20 macroblocks of the frame 140 includes text information. These four macroblocks are highlighted by the shaded squares in the metadata information 144 (or metadata 144). The circuitry of the transmitter 110 uses one of a variety of techniques for detecting the first set of one or more macroblocks. Examples of these techniques are one of a variety of edge-based algorithms that rely on computed edge densities or computed edge gradients of macroblocks, summing counts of these values in one or more histograms, and analyzing the one or more histograms for text detection.

The transmitter 110 generates a second set of one or more macroblocks by replacing a first data representation of the first set of one or more macroblocks with a second data representation different from the first data representation. In an implementation, the first data representation includes pixel color information such as one or more color values for each pixel of the macroblock corresponding to one or more color components. The second data representation does not use color values for pixels in the macroblock. Rather, the second data representation includes a distance value for each pixel in the macroblock.

In one example, a particular rendered pixel includes the pixel color values (142, 48, 96). In an implementation, each of these pixel color values is an 8-bit value corresponding to a red value, a green value, and a blue value, respectively. These color values have a range from 0 to 255 based on the 8 bits used to represent the color values. This particular pixel is in a macroblock within one of the four shaded squares corresponding to a macroblock containing text. The CPU 122 or other circuitry of the APU 120 determines a pixel distance value that represents a shortest distance between the corresponding pixel and a nearest letter of the text in the macroblock. In an implementation, the pixel distance values use a value of 0.5 to indicate the pixel is on the surface of the nearest letter, a value of 0 to indicate the pixel is located the furthest distance away from the surface but within the letter, and a value of 1 to indicate the pixel is located the furthest distance away from the surface and outside of the letter. Other values and ranges are also possible and contemplated.

In some implementations, the circuitry of the APU 120, such as the CPU or other, generates the pixel distance values by scaling the maximum color value by a ratio of the pixel distance value to the maximum pixel distance value. In other words, the APU 120 generates the pixel distance values using the expression (Maximum Color Value)×((Pixel Distance)/(Maximum Pixel Distance)). When the CPU 122 or other circuitry of the APU 120 determines the pixel distance value is 0.7 using the range 0 to 1 with 0.5 being on the surface of the letter, the APU 120 generates the pixel distance value as 255×(0.7/1), or 178. Instead of representing the pixel with the pixel color values (142, 48, 96), the APU 120 now represents the pixel with the pixel distance values (178, 178, 178). The APU 120 also updates the metadata 144 with an indication specifying that the macroblock that includes this pixel uses pixel distance values, rather than pixel color values. The APU 120 also updates the metadata 144 with indications of both foreground color and background color. The foreground color is the color of the text, such as the one or more glyphs in the particular macroblock. The background color is the color of the background behind the text in the particular macroblock. The metadata 144 is later used by the receiver 160. However, the encoder 126 does not receive the metadata 144, and the encoder 126 is unaware of which macroblocks include pixel color information and which macroblocks include pixel distance information.

In various implementations, the pixel distance value in the second data representation for a pixel is a signed distance field (SDF) value for the pixel. The SDF value represents a shortest distance between the corresponding pixel and the nearest glyph in the macroblock to the pixel. As used herein, a "glyph" is a graphical symbol used to represent an alphabet letter. For example, the alphabet letter "A" has a particular graphical symbol (or glyph) that changes based on a selected font, a selected text size, and selected characteristics such as an italicized print, bold print, and so on. In another implementation, the value in the second data representation for a pixel in the macroblock is a shortest distance between the pixel and a normal vector that begins at the closest point on the nearest glyph in the macroblock to the pixel. It is possible and contemplated that a variety of other distance information corresponding to the pixel and the nearest glyph in the macroblock can be used in the second data representation.

The circuitry of the transmitter 110 inserts, in the metadata 144 corresponding to the frame 140, one or more indications that identify the first set of one or more macroblocks indicated by the shaded squares. The transmitter also inserts, in the metadata 144, indications that specify the color values of pixels in the first set of one or more macroblocks. For a particular macroblock of the first set corresponding to one of the shaded squares of metadata 144, the transmitter 110 inserts indications of both foreground color and background color. The foreground color is the color of the text, such as the one or more glyphs in the particular macroblock. The background color is the color of the background behind the text in the particular macroblock. The encoder 126 of the transmitter 110 compresses (encodes) the macroblocks of the frame 140. Therefore, the encoder 126 compresses one or more macroblocks that include pixel color information, and additionally compresses one or more macroblocks that include pixel distance information. The encoder 126 is unaware of which macroblocks include pixel color information and which macroblocks include pixel distance information.

Afterward, the transmitter sends the metadata 144 and the encoded (compressed) macroblocks of the frame 140 to the receiver 160 with a display device. In an implementation, the transmitter sends the metadata 144 and the encoded macroblocks of the frame 140 as streaming data 130 through the network 112. The transmitter 110 sends the streaming data 130 to the receiver 160 based on received user requests from the receiver 160. The data loop from receiver 160 that begins with user requests generated by the receiver 160 and ends with the streaming data 130 being received by the receiver 160 to be decoded and displayed occurs in real-time. Combined with the limited bandwidth of communication between the transmitter 110 and the receiver 160, the processing capabilities of both the transmitter 110 and the receiver 160 need to be efficient.

The receiver 160 includes the decoder 172 for decoding (decompressing) the encoded macroblocks of the frame 140. Similar to the encoder 126, the decoder 172 does not receive the metadata 144, and the decoder 172 is unaware of which macroblocks include pixel color information and which macroblocks include pixel distance information. The receiver 160 uses the metadata 144 to perform the decoding. For example, the receiver 160 uses the metadata 144 to identify the third set of one or more macroblocks. After decoding the macroblocks of the frame 140, the receiver 160 converts the pixel distance information of one or more macroblocks to pixel color information. To do so, the receiver 160 uses the pixel color information stored in the metadata 144. The receiver 160 uses the metadata 144 to identify pixels within macroblocks that include text. For the pixel of the earlier example with pixel distance values (178, 178, 178), the receiver 160 converts these values to the pixel color values (142, 48, 96) using the foreground color and background color information stored in the metadata 144.

Using the above steps, the receiver 160 is able to generate the frame 150 with the four macroblocks that include text information of the text box 152. By encoding and transmitting pixel distance information as described, the system 100 is able to provide text information with increased clarity and sharp edges that allow the user to easily discern the alphabet letters or other symbols presented in the image of the frame 150 on a display device (screen or monitor) of the receiver 160. It is noted that the text information in the text boxes 142 and 152 can include a variety of types of symbols with a foreground color of the symbol and a single background color. The symbols are typically provided by a user by a computer keyboard. Examples of the symbols are letters of a variety of types of alphabets, punctuation marks, mathematical operators, parentheses, brackets, and so on.

Figure 2:
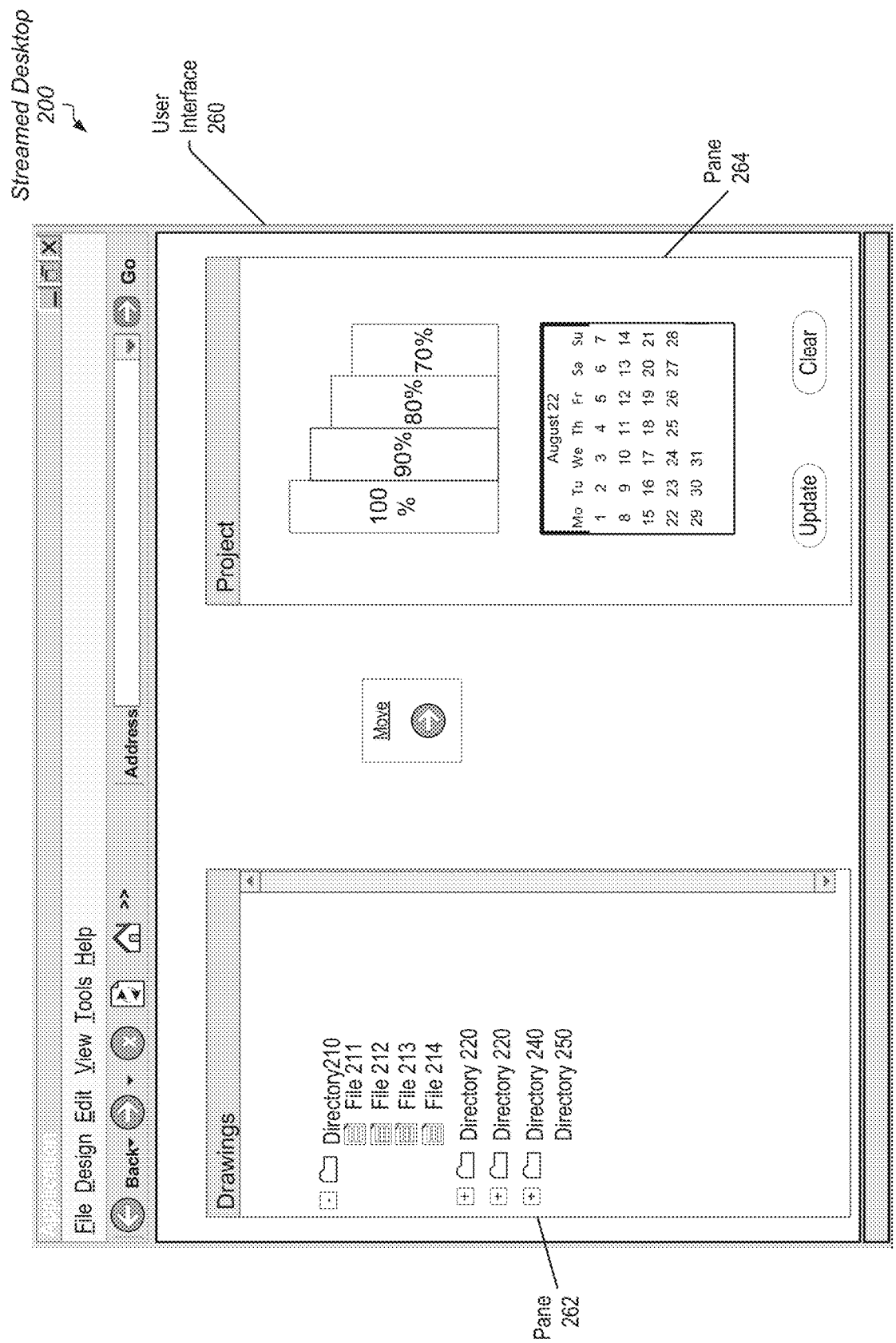
FIG. 2 is a generalized block diagram of a streamed desktop.

Turning now to FIG. 2, a generalized block diagram is shown of a portion of a streamed desktop 200 that is conveyed with efficient video transmission. The illustrated portion includes a user interface 260, which is provided as a graphical user interface (GUI). In various implementations, the user interface 260 is presented on a display device of a user's computing device after being transmitted from a remote server that supports remote desktop services (RDS). The user interface 260 is presented by a generic application that is used to generally show components of a user interface. Other components of the streamed desktop 200 are not shown for ease of illustration. For example, in various implementations, the streamed desktop 200 additionally includes a task bar, one or more icons of applications placed on the background of the streamed desktop 200, other open windows corresponding to other applications, one or more objects of an image or scene presented as the background when a single-colored background is not used, and so forth.

Similar to the image portrayed by the frame 140 (of FIG. 1), the steamed desktop 200 provides an example of an image that is streamed to a receiver from a transmitter in real time. In an implementation, the receiver is a user's computing device and the transmitter is a remote server accessed via a network such as the Internet. Similar to the text box 142 of the frame 140 (of FIG. 1), the steamed desktop 200 includes multiple regions of text information. Therefore, when a frame corresponding to the steamed desktop 200 is divided into macroblocks, several of these macroblocks include text information. For example, these macroblocks that include text information include at least the macroblocks that include the text "Directory 210," "File 211," "Directory 220," "Back," "Drawings," "Project," "Update," "Clear," "Address," "Go," the values "100%" to "70%," "August 22" in the calendar, the days of the calendar from "Mo" to "Su," the days of the calendar from "1" to "31," and so on.

As described earlier, a transmitter identifies the first set of macroblocks, stores identification information of these macroblocks in metadata information, stores pixel color information (foreground color, background color) in the metadata information, and generates a second set of macroblocks that use pixel distance information, rather than pixel color information. Therefore, the transmitter encodes one or more macroblocks that include pixel color information, and additionally encodes one or more macroblocks that include pixel distance information. Afterward, the transmitter sends the metadata information and encoded macroblocks of the video frame to the receiver with a display device.

Similar to other user interfaces, such as other GUIs, the user interface 210 includes features such as drop-down menus, a navigation bar, an address field, and so on. It is noted that the naming conventions depicted in FIG. 2 (e.g., "Directory 210", "File 211", etc.) are provided for ease of discussion. In a typical implementation, names reflective of those used in ordinary business or other environments (e.g., Documents, Spreadsheets, Tasks, Discussion Topics, as well as user-defined directory and/or file names, etc.) are used, as desired. The user interface 210 includes a "Drawings" pane 202 and a "Projects" pane 204. Within the Drawings pane 202, a hierarchy of directories and files are shown to allow the user to navigate. The illustrated hierarchy includes directories 210, 220, 220, 240, and 250. Directory 210 includes files 211-214. The user is able to select and add content of one or more of the Directories 210-250 and the Files 211-214 to the Projects pane 204 via the Move button. The Projects pane 204 includes at least a graph and a calendar. Any additions are stored with selection of the Update button, and any additions or modifications are removed with selection of the Clear button. In other implementations, the user interface 210 includes other types of buttons, drop-down menus, and so on that either show information in another manner (e.g., a pie chart, a three-dimensional figure, etc.) or provide other types of functionalities.

Figure 3:
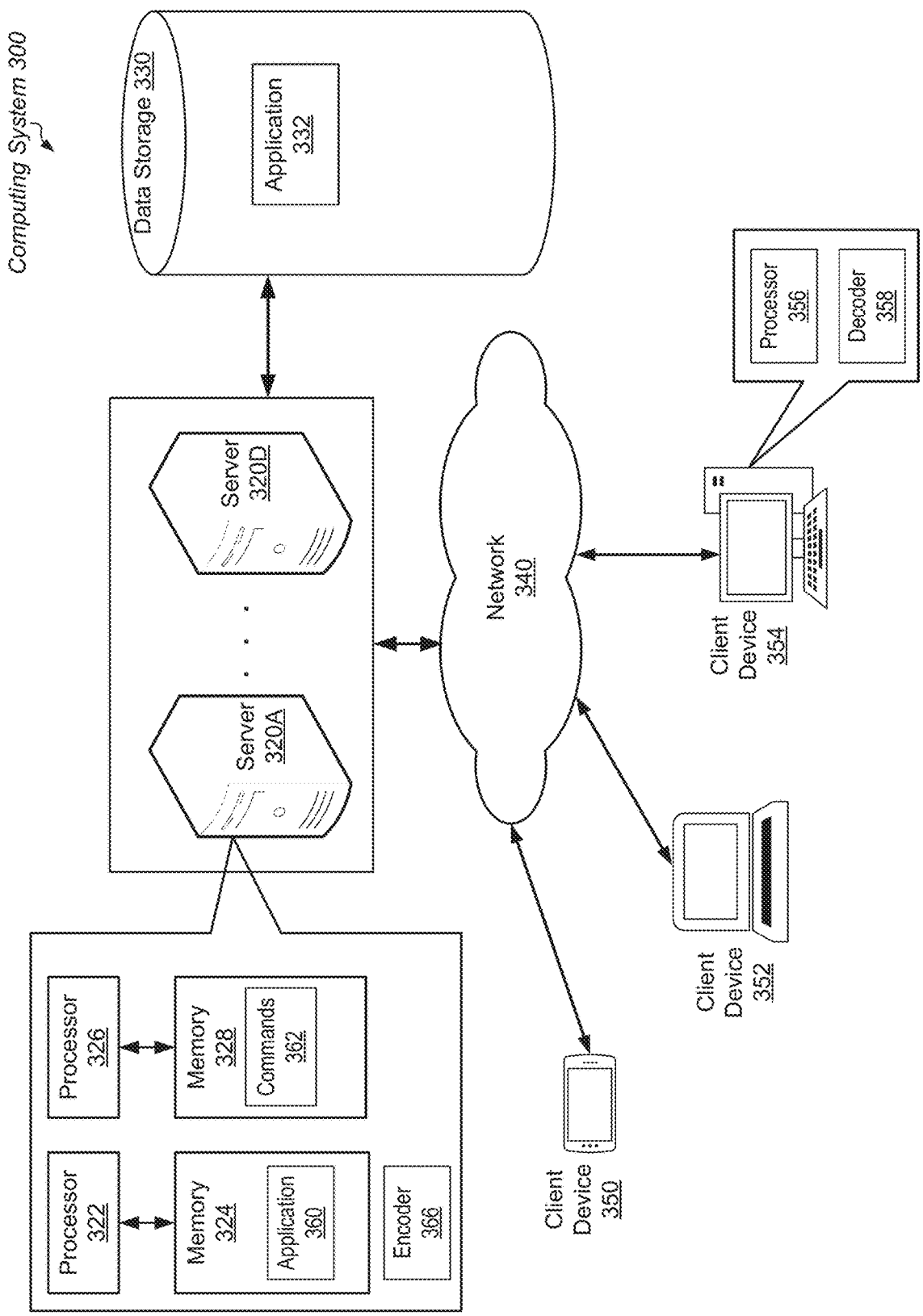
FIG. 3 is a generalized block diagram of a computing system.

Turning now to FIG. 3, a generalized diagram is shown of a computing system 300. In the illustrated implementation, the computing system 300 includes multiple client devices 350, 352 and 354, a network 340, the servers 320A-320D, and the data storage 330 that includes a copy of an application 332. As shown, the server 320A includes a processor 322 that accesses the memory 324 to process tasks, and the processor 326 that accesses the memory 328 to process tasks. Although three client devices 350, 352 and 354 are shown, any number of client devices access applications run on the servers 320A-320D. For example, the server 320A stores the application 360 in memory 324, which is a copy of the application 332 stored in the data storage 330. As shown, the client device 354 includes hardware, such as circuitry, of a processor 356 and a decoder 358. The processor 356 executes instructions of computer programs. The decoder 358 decodes encoded video frame information received from one or more of the servers 320A-320D via the network 340. The client devices 350 and 352 also include circuitry similar to the processor 356 and the decoder 358 of the client device 354. Examples of the client devices 350, 352 and 354 are a laptop computer, a smartphone, a gaming console connected to a television, a tablet computer, a desktop computer, or other.

Clock sources, such as phase lock loops (PLLs), an interrupt controller, a communication fabric, power controllers, memory controllers, interfaces for input/output (I/O) devices, and so forth are not shown in the computing system 300 for ease of illustration. It is also noted that the number of components of the computing system 300 and the number of subcomponents for those shown in FIG. 3, such as within the clients 320, can vary from implementation to implementation. There can be more or fewer of each component/subcomponent than the number shown for the computing system 300.

In various implementations, the server 320A supports a corresponding one of the client devices 350-354 accessing a streaming service, such as the application 332, and remotely requests executing the streaming service. Examples of the streaming service are a desktop streaming service, a live streaming service, a video game streaming service, or other. The streaming service provides real-time updates of video content based on inputs from the user as the user accesses the streaming service on the corresponding one of the client devices 350-354. In various implementations, the client devices 350, 352 and 354 include a network interface (not shown) supporting one or more communication protocols for data and message transfers through the network 340. The network 340 includes multiple switches, routers, cables, wireless transmitters, and the Internet for transferring messages and data. Accordingly, the network interface of the client device 350 supports one or more of the Hypertext Transfer Protocol (HTTP), the Transmission Control Protocol (TCP), the User Datagram Protocol (UDP), or another protocol for communication across the World Wide Web. In some implementations, an organizational center (not shown) maintains the application 332. In addition to communicating with the client devices 350, 352 and 354 through the network 340, the organizational center also communicates with the data storage 330 for storing and retrieving data. The data storage 330 includes one or more of a variety of hard disk drives and solid-state drives for data storage. Through user authentication, users are able to access resources through the organizational center to update user profile information, access a history of purchases or other accessed content, and download content.

In various implementations, the processors 322 and 326 have the same functionality described earlier for the CPU 122 and GPU 124 (of FIG. 1). Similarly, the encoder 366 has the same functionality described earlier for the encoder 126 (of FIG. 1). Therefore, the processor 122 translates instructions of a parallel data function call of the application 360 to commands 362 that are executable by the processor 326. The encoder 366 is capable of compressing rendered macroblocks. The servers 320A-320D include a variety of server types such as database servers, computing servers, application servers, file servers, mail servers and so on. In various implementations, the servers 320A-320D and the client devices 350, 352 and 354 operate with a client-server architectural model. In various implementations, the application 332 is one of a variety of types of parallel data applications.

The application 332 includes instructions that support parallel data algorithms. In an implementation, the application 332 includes algorithms for a graphics shader program that directs how the processor renders pixels for controlling lighting and shading effects. In addition, the application 332 can also include pixel interpolation algorithms for geometric transformations. Pixel interpolation obtains new pixel values at arbitrary coordinates from existing data. The application 332 can also include instructions for directing a SIMD core of the processor 326 (after translation by the processor 322) to perform General Matrix to Matrix Multiplication (GEMM) operations when rendering macroblocks of a video frame.

In some implementations, the application 332 (and its copy 360) is a user-requested application that is a particular video game application accessed through the network 340 that provides content in real time to a user operating one of the client devices 350-354. In other implementations, the application 332 is a user-requested application that provides a remote desktop connection for a business environment. In yet other implementations, the application 332 is a user-requested application that provides a live stream of another user broadcasting content such as cooking shows, reviews of movies, clothing, or other products, and so on. In each of these implementations, the server 320A provides rendered and compressed macroblocks of a video frame in real time to a corresponding one of the client devices 350-354.

In various implementations, the server 320A implements the steps described earlier for the transmitter 110 (of FIG. 1). For example, circuitry of the server 320A receives rendered source data of video frames of an image to be depicted on a display device of a corresponding one of the client devices 350-354. Before encoding, the server 320A identifies a first set of one or more macroblocks of the video frame that includes text. The server 320A generates a second set of one or more macroblocks by replacing pixel color information of the first set of one or more macroblocks with pixel distance information. The server 320A inserts, in metadata information, indications that identify the first set of one or more macroblocks. The server 320A also inserts, in metadata information, indications that specify the color values of pixels in the first set of one or more macroblocks. The server 320A encodes the video frame. Therefore, the server 320A encodes one or more macroblocks that include pixel color information, and additionally encodes one or more macroblocks that include pixel distance information. The server 320A sends the encoded macroblocks along with the metadata information to a corresponding one of the client devices 350-354.

Figure 4:
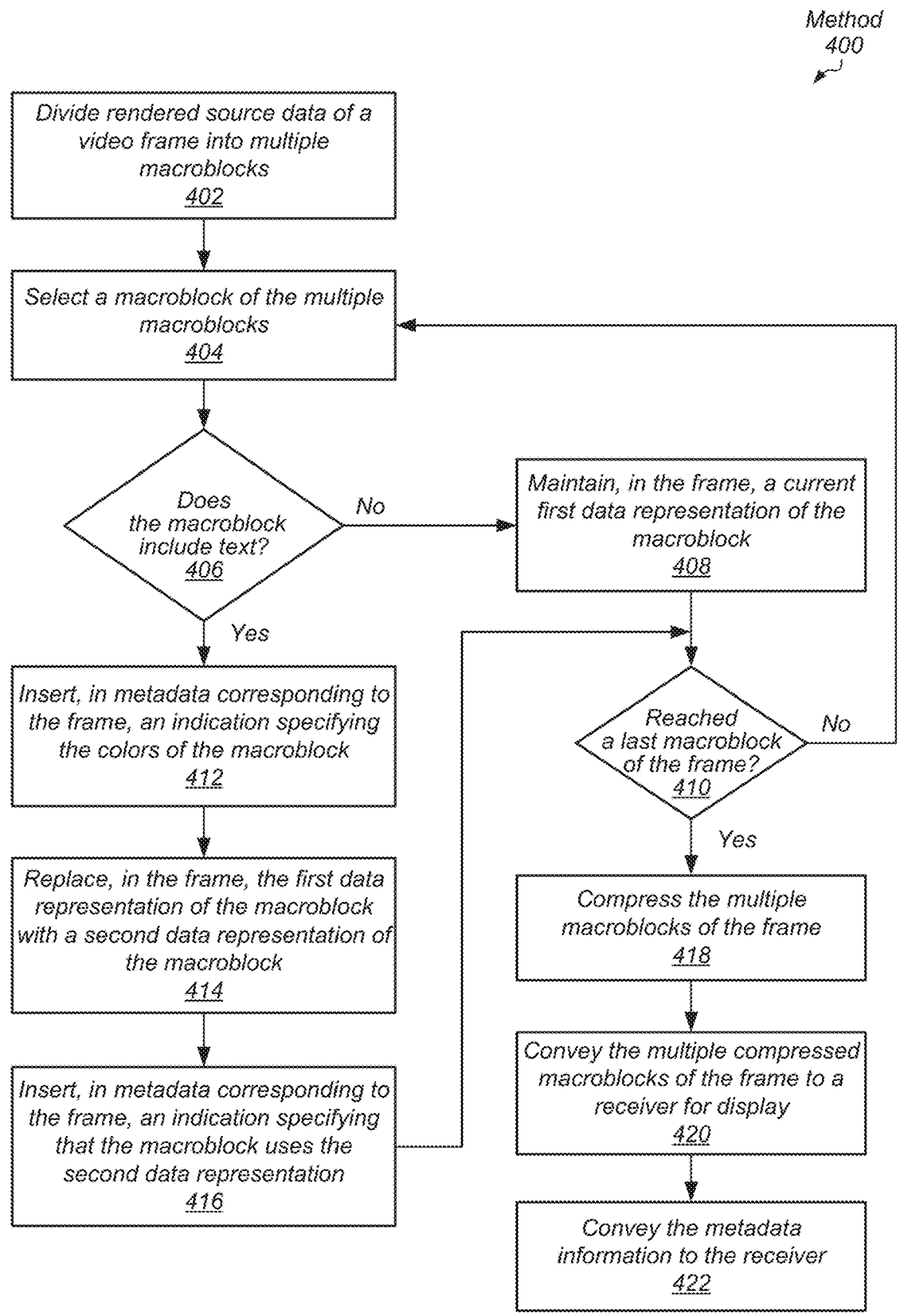
FIG. 4 is a generalized block diagram of a method for performing efficient video transmission that preserves text clarity.

Referring to FIG. 4, a generalized block diagram is shown of a method 400 for performing efficient video transmission that preserves text clarity. For purposes of discussion, the steps in this implementation (as well as in FIG. 5) are shown in sequential order. However, in other implementations some steps occur in a different order than shown, some steps are performed concurrently, some steps are combined with other steps, and some steps are absent.

In various implementations, a computing system includes a transmitter sending a video stream to a receiver over a network such as the Internet. In an implementation, the transmitter is a remote server and the receiver is a user's computing device that communicates with the remote server over the network. In some implementations, the remote server includes circuitry of an accelerated processing unit (APU) that includes multiple different integrated circuits, each providing different functionality. For example, the APU includes at least a general-purpose processing unit, such as a central processing unit (CPU), with multiple cores capable of executing instructions of a general-purpose instruction set architecture (ISA). The APU also includes a parallel data processing unit, such as a graphics processing unit (GPU), that includes the circuitry of one or more processor cores with a single instruction multiple data (SIMD) parallel architecture. The CPU translates instructions of parallel data function calls of an application to commands that are executable by the GPU. The GPU renders a video frame based on the commands, and stores the rendered video frame in a buffer. The circuitry of the transmitter divides the rendered source data of the video frame into multiple macroblocks (block 402).

The transmitter selects a macroblock of the multiple macroblocks (block 404). The transmitter determines whether the selected macroblock includes text. For example, the transmitter uses one of a variety of techniques for detecting text within the selected macroblock. Examples of these techniques are one of a variety of edge-based algorithms that rely on computed edge densities or computed edge gradients of macroblocks, summing counts of these values in one or more histograms, and analyzing the one or more histograms for text detection. If the transmitter does not detect text within the selected macroblock ("no" branch of the conditional block 406), then the transmitter maintains, in the video frame, a current first data representation of the macroblock (block 408). In an implementation, the first data representation includes color pixel information. In an example, a particular rendered pixel includes the pixel color values (212, 56, 180). In an implementation, each of these pixel color values is an 8-bit value corresponding to a red value, a green value, and a blue value, respectively. These color values have a range from 0 to 255 based on the 8 bits used to represent the color values. If the transmitter has not yet reached the last macroblock of the video frame ("no" branch of the conditional block 410), then control flow of method 400 returns to block 404 where the transmitter selects a macroblock of the multiple macroblocks.

If the transmitter detects text within the selected macroblock ("yes" branch of the conditional block 406), then the transmitter inserts, in metadata corresponding to the video frame, an indication specifying the colors of the macroblock (block 412). For example, the transmitter inserts indications of both the foreground color of the text, such as the one or more glyphs in the macroblock, and the background color of the macroblock. The transmitter replaces, in the frame, the first data representation of the macroblock with a second data representation of the macroblock (block 414). For example, the transmitter generates a second macroblock that includes the second data representation of the selected first macroblock. In an implementation, the second data representation includes pixel distance information such as signed distance field (SDF) values of pixels in the macroblock. In an implementation, the pixel distance values use a value of 50 to indicate the pixel is on the surface of the nearest glyph, a value of 0 to indicate the pixel is located the furthest distance away from the surface but within the glyph, and a value of 100 to indicate the pixel is located the furthest distance away from the surface and outside of the glyph. Other values and ranges are also possible and contemplated.

The transmitter inserts, in the metadata information corresponding to the video frame, an indication specifying that the macroblock uses the second data representation (block 416). Therefore, the transmitter identifies a set of one or more macroblocks of the video frame that includes text information and now uses the second data representation. In some implementations, the transmitter generates the pixel distance values by scaling the maximum color value by a ratio of the pixel distance value to the maximum pixel distance value. In other words, the transmitter generates the pixel distance values using the expression (Maximum Color Value)×((Pixel Distance)/(Maximum Pixel Distance)).

When the transmitter determines the pixel distance value is 36 using the range 0 to 100 with 50 being on the surface of the glyph, the transmitter generates the pixel distance value as 255×(36/100), or 92. Instead of representing the pixel with pixel color values such as (24, 208, 88), the transmitter now represents the pixel with the pixel distance values (92, 92, 92). The transmitter also updates the metadata 144 with an indication specifying that the macroblock that includes this pixel uses pixel distance values, rather than pixel color values, along with the foreground and background colors of the macroblock.

If the transmitter has reached the last macroblock of the video frame ("yes" branch of the conditional block 410), then the transmitter compresses (encodes) the multiple macroblocks of the video frame (block 418). For example, the APU of the transmitter further includes a video encoder for compressing video frames of an image to be depicted on a display device of the receiver such as a user's computing device. Therefore, the transmitter encodes one or more macroblocks that include pixel color information, and additionally encodes one or more macroblocks that include pixel distance information. However, the encoder does not receive the metadata, and the encoder is unaware of which macroblocks include pixel color information and which macroblocks include pixel distance information. The transmitter conveys the multiple compressed macroblocks of the video frame to the receiver for display (block 420). The transmitter also conveys the metadata information to the receiver (block 422). In some implementations, the metadata information is stored within the multiple compressed macroblocks of the video frame. In other implementations, the metadata information is stored separately from the multiple compressed macroblocks.

Figure 5:
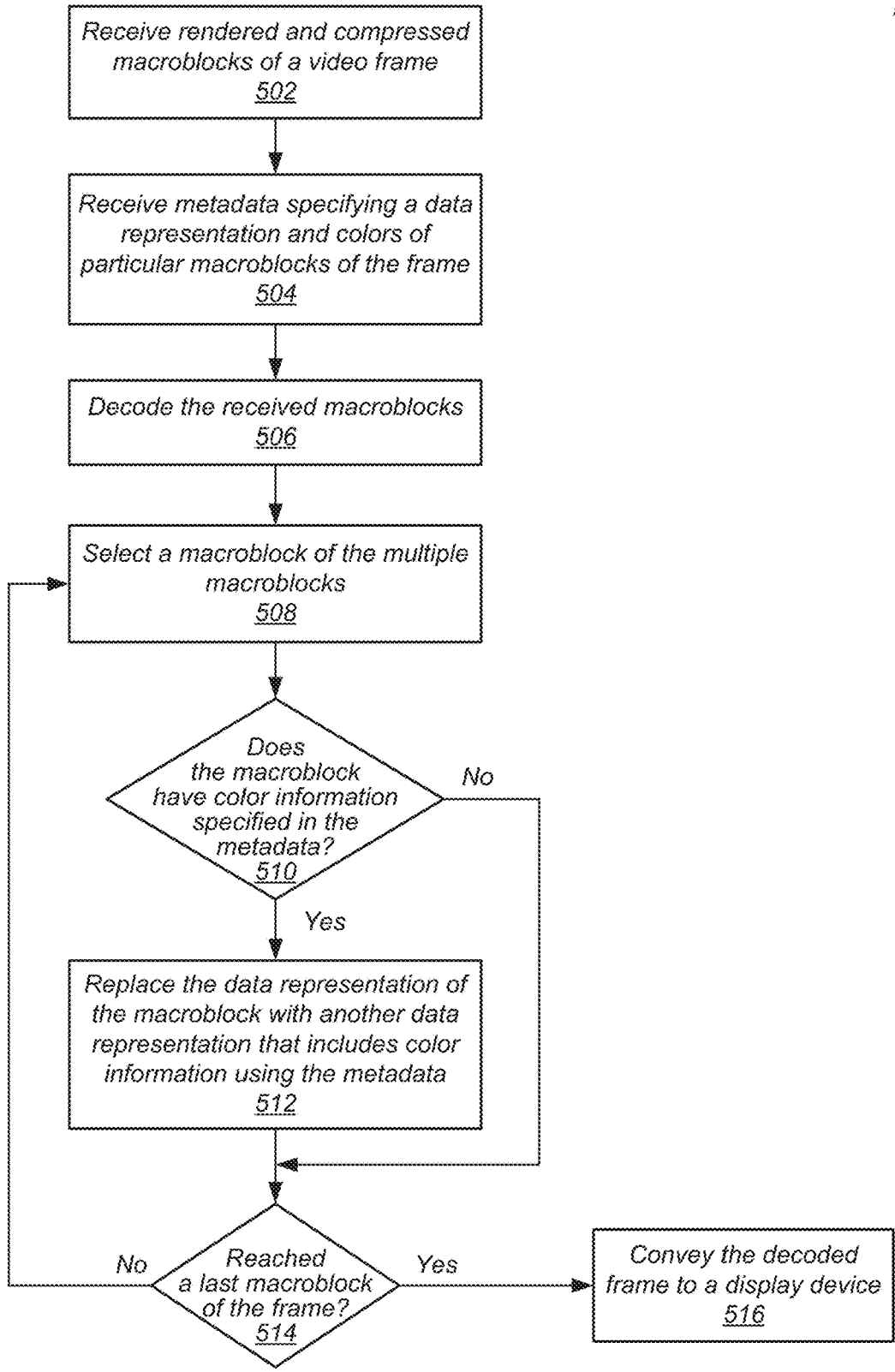
FIG. 5 is a generalized block diagram of a method for supporting efficient video transmission that preserves text clarity.

Referring to FIG. 5, a generalized block diagram is shown of a method 500 for supporting efficient video transmission that preserves text clarity. In various implementations, a computing system includes a transmitter sending a video stream to a receiver over a network such as the Internet. The receiver receives rendered and compressed macroblocks of a video frame (block 502). The receiver also receives metadata information specifying a data representation and colors of particular macroblocks of the video frame (block 504). The circuitry of the receiver, such as a decoder, decodes (decompresses) the macroblock (block 506). Similar to the encoder of the transmitter, the decoder of the receiver does not receive the metadata indicating pixel distance values, and the decoder is unaware of which macroblocks include pixel color information and which macroblocks include pixel distance information.

The receiver selects a macroblock of the multiple macroblocks (block 508). In some implementations, the metadata information is stored within the multiple compressed macroblocks of the video frame. In other implementations, the metadata information is stored separately from the multiple compressed macroblocks. Using the metadata information, the receiver determines whether the selected macroblock includes text. If so, the metadata information includes pixel color information for the selected macroblock. For example, the metadata information includes an identifier of the selected macroblock and indications of both the foreground color of the text, such as the one or more glyphs in the macroblock, and the background color of the macroblock. The selected macroblock does not include pixel color information. Rather, as described earlier, the selected macroblock includes one of a variety of types of distance information corresponding to the pixel and the nearest glyph in the selected macroblock.

If the receiver determines that the selected macroblock has pixel color information specified in the metadata information ("yes" branch of the conditional block 510), then the receiver, using the metadata information, replaces the data representation of the macroblock with another data representation that includes pixel color information. For example, the received version of the selected macroblock currently uses a data representation that includes pixel distance information such as signed distance field (SDF) values of pixels in the macroblock. The receiver converts the pixel distance information to pixel color information (block 512). If the receiver determines that the selected macroblock does not have pixel color information specified in the metadata information ("no" branch of the conditional block 510), then block 512 of method 500 is skipped.

If the receiver has not yet reached the last macroblock of the video frame ("no" branch of the conditional block 514), then control flow of method 500 returns to block 508 where the receiver selects a macroblock of the multiple macroblocks. However, if the receiver has reached the last macroblock of the video frame ("yes" branch of the conditional block 514), then the receiver conveys the decoded video frame to a display device (block 516).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   circuitry configured to:
   replace a first data representation of a first set of one or more blocks of a plurality of blocks of a video frame with a second data representation different from the first data representation, responsive to the first set of one or more blocks including text information, wherein the first data representation corresponds to pixel color values and the second data representation does not correspond to pixel color values; and
   compress, using the second data representation, the first set of one or more blocks.

2. The apparatus as recited in claim 1, wherein the circuitry is further configured to convey, via a network, the first set of one or more blocks to a receiver with a display device.

3. The apparatus as recited in claim 1, wherein the circuitry is further configured to insert, in metadata corresponding to the video frame, a first plurality of indications specifying colors used in the first set of one or more blocks.

4. The apparatus as recited in claim 3, wherein the circuitry is further configured to insert, in the metadata, a second plurality of indications identifying the first set of one or more blocks as blocks of the video frame using the second data representation.

5. The apparatus as recited in claim 4, wherein the circuitry is further configured to convey, via a network, the metadata to a receiver with a display device.

6. The apparatus as recited in claim 4, wherein the circuitry is further configured to compress, using the first data representation, one or more blocks of the plurality of blocks of the video frame, in response to the one or more blocks do not include text information.

7. The apparatus as recited in claim 1, wherein the second data representation comprises signed distance field information of pixels.

8. A method, comprising:
   storing, by circuitry of a memory, rendered source data of a video frame to view on a display device;
   receiving the video frame by circuitry of an accelerated processing circuit;
   replacing, by the circuitry, a first data representation of a first set of one or more blocks of a plurality of blocks of the video frame with a second data representation different from the first data representation, responsive to the first set of one or more blocks including text information, wherein the first data representation corresponds to pixel color values and the second data representation does not correspond to pixel color values; and
   compressing, by the circuitry using the second data representation, the first set of one or more blocks.

9. The method as recited in claim 8, further comprising conveying, by the circuitry via a network, the first set of one or more blocks to a receiver with a display device.

10. The method as recited in claim 8, further comprising inserting, in metadata corresponding to the video frame by the circuitry, a first plurality of indications specifying colors used in the first set of one or more blocks.

11. The method as recited in claim 10, further comprising inserting, in the metadata by the circuitry, a second plurality of indications identifying the first set of one or more blocks as blocks using the second data representation.

12. The method as recited in claim 11, further comprising conveying, by the circuitry via a network, the metadata to a receiver with a display device.

13. The method as recited in claim 11, further comprising compressing, by the circuitry using the first data representation, one or more blocks of the plurality of blocks of the video frame, in response to the one or more blocks do not include text information.

14. The method as recited in claim 8, wherein the second data representation comprises signed distance field information of pixels.

15. A computing system comprising:
a memory comprising circuitry configured to store rendered source data of a video frame to view on a display device;
an accelerated processing circuit comprising circuitry configured to:
receive the video frame;
replace a first data representation of a first set of one or more blocks of a plurality of blocks of the video frame with a second data representation different from the first data representation, responsive to the first set of one or more blocks including text information, wherein the first data representation corresponds to pixel color values and the second data representation does not correspond to pixel color values; and
compress, using the second data representation, the first set of one or more blocks.

16. The computing system as recited in claim 15, wherein the circuitry is further configured to convey, via a network, the first set of one or more blocks to a receiver with a display device.

17. The computing system as recited in claim 15, wherein the circuitry is further configured to insert, in metadata corresponding to the video frame, a first plurality of indications specifying colors used in the first set of one or more blocks.

18. The computing system as recited in claim 17, wherein the circuitry is further configured to insert, in the metadata, a second plurality of indications identifying the first set of one or more blocks as blocks using the second data representation.

19. The computing system as recited in claim 18, wherein the circuitry is further configured to convey, via a network, the metadata to a receiver with a display device.

20. The computing system as recited in claim 15, wherein the second data representation comprises signed distance field information of pixels.

\* \* \* \* \*